Feb. 23, 1932.                W. HORNAUER                1,846,110
                      MAGNETIC SOUND RECORD CARRIER
                         Filed Sept. 20, 1930

Inventor:
Willy Hornauer

Patented Feb. 23, 1932

1,846,110

UNITED STATES PATENT OFFICE

WILLY HORNAUER, OF BERLIN-NEUKOELLN, GERMANY, ASSIGNOR TO TELEGRAPHIE-PATENT-SYNDIKAT, G. M. B. H., OF BERLIN, GERMANY

MAGNETIC SOUND RECORD CARRIER

Application filed September 20, 1930, Serial No. 483,303, and in Germany September 25, 1929.

When magnetic sound record carriers in the form of steel bands are synchronized with cinematographic apparatus, they are sometimes provided with apertures for engagement with a sprocket drum or other feeding element. The hard steel band wears the feeding elements excessively, and the variation in the cross sectional area of the band caused by the perforations, has a corresponding effect on the magnetic flux and on the tone reproduction.

The object of the present invention is to remedy this defect, and the invention consists in superimposing a non-perforated record carrier on a perforated conveying band of nonmagnetic material. The two bands are connected at the ends and are wound together on the take up and delivery rollers, the operative portions of the bands allowing of being separated, one for passing through the electro-magnetic talking head and the other for engagement with the feeding element.

This arrangement has the additional advantage that the conveying band prevents the convolutions of the steel band from coming into direct contact with and being magnetically influenced by one another.

Figure 1:
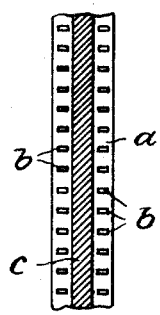
Figure 2:
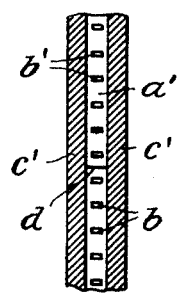
Figure 3:
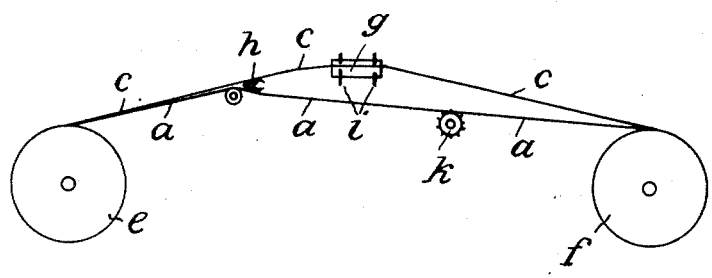

Figs. 1 and 2 of the accompanying drawings represent views of different arrangements of record carriers and conveying bands, and Fig. 3 is a view showing the bands passing through a reproducing apparatus.

A magnetic sound record carrier in the form of a steel band $c$ of uniform cross section, is superimposed on a conveying band $a$ of non-magnetic material such as paper, celluloid or the like. A conveying band is provided with apertures $b$ for engagement with a sprocket drum or other feeding element. The bands are interconnected at the ends and are wound together from a delivery roller $e$ on to a take up roller $f$. A wedge $h$ is arranged so as to guide and separate the two bands between the rollers, the band $c$ being led between the coils $i$ of an electro-magnetic talking head $g$, while the band $a$ passes over a sprocket drum $k$ which is geared to the film feeding device of a cinematographic apparatus and which engages in the apertures $b$ so as to feed the record carrier in synchronism with the film.

Fig. 1 shows a single steel band $c$ arranged between two rows of apertures $b$ on a conveying band $a$. According to Fig. 2 two steel bands $c^1$ are arranged at opposite sides of a single row of apertures $b^1$ on a conveying band $a^1$.

The conveying band may be provided with markings $d$ indicating measures of length.

I claim:

1. A magnetic sound record carrier comprising a steel band, and a conveying element in the form of a non-magnetic perforated band whereon said steel band is superimposed, two bands being interconnected at the ends to allow the operative portions to be spaced and to follow different paths.

2. An electro-magnetic sound recording and reproducing device comprising a perforated conveying band of non-magnetic material, a record carrier in the form of a steel band superimposed on said carrier band and connected thereto at the ends, a pair of rollers whereon said bands are wound together, means for separating the two bands between the rollers, an electro-magnetic talking head receiving and guiding the steel band, and a sprocket drum engaging in the apertures of the conveying band.

WILLY HORNAUER.